United States Patent [19]

Lemoine et al.

[11] 4,053,926
[45] Oct. 11, 1977

[54] TIMING ERROR COMPENSATOR

[75] Inventors: Maurice G. Lemoine; Leonard A. Pasdera, both of Redwood City, Calif.

[73] Assignee: Ampex Corporation, Redwood City, Calif.

[21] Appl. No.: 554,886

[22] Filed: Mar. 3, 1975

[51] Int. Cl.² .................... H04N 5/785; H03K 13/02
[52] U.S. Cl. .......................................... 358/8; 360/36; 340/347 DA
[58] Field of Search ............... 358/8, 4, 13, 127; 360/36, 26, 32, 37, 27; 178/6.6 TC, 69.5 R, 69.5 CB, DIG. 3, 69.5 DC, 69.5 TV; 340/347 DA

[56] References Cited
U.S. PATENT DOCUMENTS

| | | | |
|---|---|---|---|
| 3,609,560 | 9/1971 | Greenberg | 178/69.5 |
| 3,659,040 | 4/1972 | Fujita et al. | 358/8 |
| 3,746,800 | 7/1973 | Stuart | 178/69.5 |
| 3,754,098 | 8/1973 | Abramson et al. | 178/69.5 |
| 3,761,646 | 9/1973 | Beauviala | 360/27 |
| 3,855,617 | 12/1974 | Jankowski et al. | 360/32 |
| 3,860,952 | 1/1975 | Tallent et al. | 358/8 |
| 3,883,685 | 5/1975 | Yumdee et al. | 178/DIG. 3 |
| 3,887,941 | 6/1975 | Dann et al. | 360/37 |
| 3,931,638 | 1/1976 | Lentz et al. | 178/69.5 |
| 3,982,277 | 9/1976 | Naylor | 360/36 |

OTHER PUBLICATIONS

"New Technique for Time-Base Stabilization of Video Recorders", IEEE Trans., vol. BC-17, No. 1, C. H. Coleman, Mar. 1971, pp. 29-36 inc.
Proceedings of the Conference on Video and Data, "Digital Time Corr. of VTR Color T.V. Sigs.", by S. M. Edwardson, July, 1973, pp. 27-39 inc.

Primary Examiner—John C. Martin
Attorney, Agent, or Firm—Ralph L. Mossino

[57] ABSTRACT

A time displacement adjustment device compensates time base errors that progressively cumulate in a time varying signal having a synchronizing information component from which the signal time base can be determined. Periodically, the synchronizing component is sampled and a representation thereof continuously generated with the component's timing relationship to the signal retained. Each continuously generated representation and the succeeding sample of the synchronizing component are compared to determine the time base error that progressively occurs in the signal between the successive samples of the synchronizing component. That signal is expanded or compressed accordingly to correct the erroneous timing.

31 Claims, 1 Drawing Figure

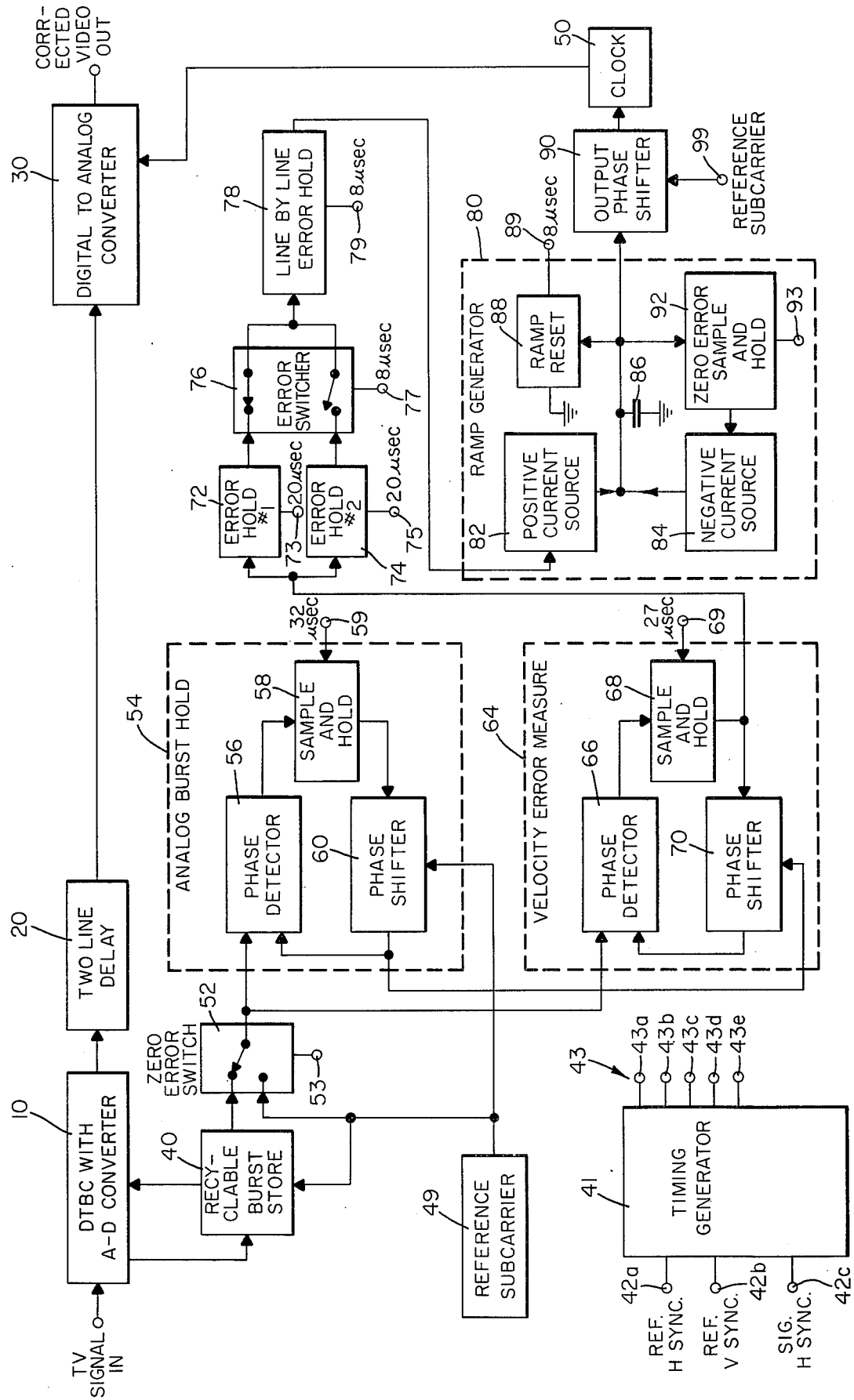

TIMING ERROR COMPENSATOR

BACKGROUND OF THE INVENTION

This invention relates generally to time displacement of time varying signals particularly suited to compensate time base errors that occur in a signal reproduced from a medium which stores the time function of the signal. When reproducing signals stored in such a medium, ideally, the reproduction operation is carried out under conditions identical to those existing during the record operation for the purpose of avoiding or minimizing the introduction of unacceptable time base errors in the reproduced time varying signal. Unfortunately, however, general time base errors can occur from a variety of causes. For example, in a magnetic storage medium, signal timing errors are commonly caused by changes in medium dimensions due to environmental effects, such as stretching of magnetic tape due to tension produced by a tape transport, head tip medium penetration changes or differences in the relative head to medium record and reproduce velocities. Relative head to medium velocity errors ordinarily occur as a result of dimensional changes in the medium or imperfect operation of the head motor and medium transport systems.

When recording and reproducing wideband signals containing data and synchronizing information, such as picture or video data information and periodically occurring timing or pilot tone synchronizing information, particularly with rotary head video tape recorders, time base errors often occur in each period of the reproduced wideband signal. A color television signal is a wideband signal including periodically occurring vertical and horizontal pulses and pilot or color burst synchronizing information and video data information. Such signals are particularly sensitive to timing errors. One form of time base error encountered is commonly referred to as velocity error. Such errors arise from geometric tape guiding inaccuracies that cause differences between the relative head to tape velocity during recording and reproduction. These errors result in a progressive phase shift of the color subcarrier during a horizontal line. A display of a color television signal with such phase shifts will show a progressively cumulative change in color (hue) toward the right side of the video display. This invention is particularly suited to compensating such progressive time base errors which occur during a period of a time varying signal.

Head to tape velocity errors comprise one component of general time base error. Other components of time base error are the line by line mispositioning of the horizontal synchronizing pulses (H sync) and the erroneous time or phase relationships between components of the synchronizing information, such as H sync and color burst. Line by line time base errors can be compensated by correcting the phase of the reproduced television signal line by line in accordance with the detected position error of each horizontal synchronizing pulse and the detected phase error of each color burst. A known system of correcting such time base errors utilizes adjustable time delay devices inserted in the signal path. In such systems, the time base error is measured and the amount of time delay inserted in the signal path is adjusted to compensate for the measured error. One known system disclosed in U.S. Pat. No. 3,202,769 utilizes a voltage variable delay line in the signal path. A voltage corresponding to the measured time base error is applied to the delay line to provide the necessary delay for the analog television signal. Other known systems utilize lumped element and glass delay lines to compensate the analog color television signal as it is transmitted along the signal path.

More recently, the utilization of digital techniques has been proposed to provide the necessary time base correction. One such system is disclosed in commonly assigned U.S. Pat. Application Ser. No. 464,269, filed Apr. 25, 1974, by Maurice G. Lemoine for a TIME BASE CORRECTOR now abandoned in favor of continuation Ser. No. 557,708. In this digital system, each line of the analog television signal is converted to a digital form. The digitized line is then stored in a controllable digital delay device. The delay is determined by the error signal to provide the necessary time base correction.

Although the systems disclosed in U.S. Pat. No. 3,202,769 and U.S. Pat. Application Ser. No. 557,708 correct line by line time base errors at the beginning of each color television line, they do not eliminate the effects of errors progressively cumulating within each television line or period of a signal.

Velocity error compensation has heretofore been known. U.S. Pat. No. 3,428,745 is one example of known velocity error compensators used in conjunction with an analog delay line time base error corrector. The time base error corrector compensates for line by line errors at the start of each television line. The velocity compensator further provides a continuous phase compensation of each color television line to adjust chroma phase for purposes of eliminating the progressive intra line time base error that occurs during a line to cause an undesirable shift of hue progressing from left to right in the television picture. Such velocity error compensators approximate the progressively cumulative error of a line by deriving an error compensation signal from comparisons of color burst phase information of widely separated lines (64 lines in quadruplex video tape recorder) of the television signal. This approximation technique does not provide an error compensation signals related to the actual cumulative error of the line whose time base is to be adjusted. Furthermore, such compensators are unsuitable for use in conjunction with digitized time base error correctors such as disclosed in U.S. Ser. No. 557,708. Existing velocity compensators, moreover, vary the chroma phase by using the same vernier delay line utilized for time base correction. The resultant disadvantage is that the amount of velocity compensation range is limited to the residual delay range left in the delay line after time base correction. This range may be less than that required for complete chroma phase compensation, which can amount to ± 180° of phase shift from the beginning to the end of the television line.

Some time base error compensators rely on averaging techniques to compensate for progressively cumulative time base errors. Generally, such devices provide an error compensation signal dependent upon the average of several periods of accumulated error. Such devices are incapable of rapidly responding to high rate and, especially, large line to line time base error changes.

Line by line analog delay line time base compensators have been employed in color television signal processing systems to compensate progressively cumulative errors in each line of the television signal. Such existing systems employ voltage controlled adjustable delay lines to delay the analog color burst signal of one line so that it can be phase compared to the analog color burst of the next succeeding line. This requires a delay line capable of providing a precise one line delay. Such adjustable delay lines are very expensive and require careful control of the electrical length to make certain that the delayed analog color burst is available at the correct time of the analog color burst of the next succeeding line. An analog line by line time base compensator of this kind is employed in the video tape recorder manufactured by Ampex Corporation under the model designation AVR-1.

SUMMARY OF THE INVENTION

Accordingly, the present invention comprises a signal time displacement device for time varying information signals including a synchronizing component from which the time base of the signal can be determined. Time displacement of the information signal is effected by means for periodically sampling the synchronizing component and continuously providing a representation of the intra period time base information contained in each sampled synchronizing component for a time extending beyond the succeeding sampling. The intra period time base information of each continuously provided representation and that of the synchronizing component at the time of the succeeding sampling are compared by means which is responsive to provide a time base difference signal. This time base difference signal is employed by means which is responsive to time displace progressively according to such signal the period of the information signal occurring between the time compared sample points of the synchronizing signal component. The signal time displacement device of the present invention is particularly suited for compensating velocity errors generated in a rotary head magnetic recording and reproducing system. The present invention is advantageously utilized with a system in which an analog information signal is converted to a digital form and reconverted to an analog form and particularly when the analog signal includes periodically occurring timing or synchronizing signals. A preferred embodiment of the device is designed to be utilized in conjunction with a digital time base corrector, such as disclosed in the aforementioned U.S. Ser. No. 557,708, to compensate for time base errors line by line. In that use, the reproduced analog information signal is converted to a digital form, whereupon it passes through a digital delay network and is reconverted to an analog form.

As utilized in a color television recorder, the velocity compensator includes circuitry for continuously providing a representation of the color burst phase of each line of the television signal and comparing the phase of such continuously provided color burst phase representation with the phase of the color burst of the next occurring or succeeding television line. The detected phase difference is representative of the amount of color hue or chroma phase change or time base error that occurs during the television line between successive color bursts and concomitant correction required in that line. Means are provided to generate a line by line error signal representative of the detected phase difference. This error signal is coupled to control the time base of an adjustable clock generator whereby the time base of the clock signal generated thereby can be independently determined for each line. The clock signal generated is utilized by a digital to analog converter to reconvert the digitized television information to an analog form with the progressive chroma phase error compensated. Advantageously, the progressive phase error is compensated by progressively varying the clock signal rate accordingly. The digital to analog converter thusly is operated to provide storage for holding the signal until clocked out in analog compensated form.

To generate the error signal, the velocity compensator continuously provides a representation of the color burst phase of each television line so that the phase of the color burst may be compared with the phase of the color burst of a succeeding line. An error signal is derived from the comparison and used to compensate time base errors in the line of television information between the successive color bursts. If color burst signals are not available from successive television lines in time to permit the determination and correction of errors in the television line occurring between the bursts before the reconversion of the digitized line of television information to analog form, the time displacement adjustment device of the present invention contemplates the provision of a suitable delay device for the digitized television information to afford the necessary time delay.

The time displacement device of the present invention conveniently provides very accurate timing displacement of time varying signals because it determines the desired time displacement by the periodic examination of a continuously available representation of the actual timing or synchronizing component contained in the signal and it independently generates a separate time displacement signal for the period between successive examinations. Each separate, independently generated time displacement signal provides very accurate time displacement of the defined period and the provision of successive time displacement signals enables very accurate continuous timing adjustment of the time varying signal.

DESCRIPTION OF A PREFERRED EMBODIMENT

The compensator of the present invention is described in detail in the following with reference to the sole FIGURE illustrating one preferred embodiment of the invention as arranged to compensate velocity errors in a color television signal reproduced from a magnetic recording thereof by a rotary head magnetic tape recorder. However, it will be readily apparent upon consideration of the description of such preferred embodiment together with the foregoing that the present invention can be utilized to introduce time displacements in other signals for purposes other than correcting time base errors, such as for the purpose of intentionally time displacing error-free signals. As long as the signal being displaced in time includes a synchronizing component, such as the color burst signal in a composite color television signal or a continuously occurring pilot tone in other information signals, providing signal time base information, the time displacement device of the present invention can be utilized to determine and effect a desired alteration of the signal time base. Furthermore, the time base of time varying signals provided by sources other than magnetic tape or other recorders can be advantageously altered in a controlled fashion by use of the time displacement device of the present invention.

Referring to the sole FIGURE, a reproduced analog color television signal received from the rotary head of a magnetic recorder is applied to the input of a time base corrector 10, wherein the misposition of the horizontal synchronizing pulses and erroneous phase of the color burst are corrected at the beginning of each horizontal line. A digital time base corrector advantageously employed with this velocity compensator embodiment of the present invention includes an analog to digital converter and is more particularly disclosed in the aforementioned U.S. Application Ser. No. 557,708. The time base corrector 10 digitizes the color television signal, which then travels along a main path through a digital two line delay 20. A delay of two nominal television lines is required for operation of this embodiment of the velocity compensator for reasons to become apparent. The time base corrected and delayed digitized signal is reconverted to an analog form and output by digital to analog converter 30. The rate of conversion by converter 30 is controlled for a purpose to be described by a line by line adjusted clock signal applied thereto from variable clock generator 50. Because the time base correction process usually renders the input synchronizing components preceding the video component of each line unuseable, the corrected video information output by the converter 30 is passed through a standard video signal processor (not shown), which inserts new synchronizing information to reconstitute a compensated color television signal.

The color burst signal present at the beginning of each television line is detected, sampled and digitized by the corrector 10, the digitized sample of the burst signal being applied to a recyclable burst store 40 for storage and continuous availability during the remainder of the television line. Because the digital time base corrector 10 described in the above mentioned application Ser. No. 557,708 includes a memory circuit that stores and continuously regenerates in analog form an actual representation of the color burst signal included in each television line for the interval of the television line, this velocity compensator embodiment of the present invention may conveniently utilize the device as recyclable burst store 40. The memory circuit employed as recyclable burst store 40 receives a sample of the color burst in digital form and stores the sampled burst for the entire length of the television line so that its timing relationship to the line of information is retained. This is accomplished by storing and repetitively regenerating the color burst sample in a recyclable register clocked by a signal derived from the fixed timing reference signal provided by the reference subcarrier source 49. The burst store 40 includes a digital to analog converter (not shown) wherein the continuously regenerated sample of the burst signal is reconverted to analog form so that it may be utilized in the phase comparison circuitry of the velocity compensator to generate a representation of the time base of the burst signal continuously at least during a portion of the next line of the television signal including its color burst signal. A more detailed description of this burst store 40 can be had by reference to aforementioned U.S. Application Serial No. 557,708.

The analog burst signal representation is applied by burst store 40 through a zero error switch 52 to the inputs of analog burst hold 54 and of velocity error measure 64. Zero error switch 52 is schematically indicated in the FIGURE as a simple switch but may comprise any suitable circuitry to switch between two positions or states. In the normal position as shown, the burst signal is applied to the analog burst hold 54 and velocity error measure 64, each of which has a phase lock loop for generating and holding a representation of the phase of the applied burst signal.

The phase lock loop of analog burst hold 54 consists of phase detector 56, sample and hold 58 and phase shifter 60. Phase detector 56 compares the phase difference between two signals applied at its inputs and provides a difference signal at its output as a dc voltage level which is coupled to the input of the sample and hold 58. The output of the sample and hold 58 is coupled to the control input of the phase shifter 60. Phase shifter 60 is controlled by the sampled difference signal provided by the sample and hold 58 to shift the phase of a signal applied at its input in accordance with the difference signal. In this embodiment, a reference signal having a fixed time base is provided by a fixed frequency reference subcarrier source 49 to the clock input of the phase shifter. The reference signal is shifted in phase before being applied from the output of phase shifter to one input of phase detector 56. The analog burst signal obtained from the television signal being corrected is coupled directly to the other input of phase detector 56, which generates a difference signal in a known manner having a valve necessary, when applied to phase shifter 60, to maintain the phase of the two signals applied thereto coincident. The phase of the applied reference subcarrier is shifted in accordance with the sampled difference signal to coincide with the phase of the color burst applied to phase detector 56. In this manner, a representation of the phase of the sampled color burst of each line of the input television signal is obtained.

The shift in the phase of the applied reference subcarrier occurs, hence, phase representation, is obtained during a 32 usec. sample period just prior to the end of the television line including the color burst then being generated by burst store 40. The length of the sample period is made sufficient to assure accurate operation of the analog burst hold 54. At the end of the 32 usec. sample period, the phase lock loop opens at the input side of sample and hold 58, whereby the dc voltage difference signal provided by the phase detector 56 at the end of the television line to be corrected is held at the output of the sample and hold to maintain the shifted phase reference subcarrier representation of the color burst phase beyond the end of that line.

The foregoing sample and hold operations are controlled by gating signals provided by a timing generator 41. Timing generator 41 includes digital counters interconnected by logic circuits, which respond to the occurrence of each of the horizontal sync (H sync) and vertical sync (V sync) pulses provided by a reference source and signal H sync provided by the time base corrector 10 at input terminals 41a and 42b and 42c, respectively, to generate the required, properly timed gating signals at the output terminals 43. The 32 usec. sample period is defined by a 32 usec. gating signal present at the output terminal 43a of the timing generator 41. This gating signal is generated during a 32 usec. period at the end of the period of a television line. In the NTSC standard, the television line period is approximately 63.5 usec. To correct NTSC color television signals, the timing generator 41 is arranged to issue the 32 usec. gating signal about 31.5 usec. after the occurrence of the signal H sync at its input terminal 42c.

The 32 usec. gating signal is coupled to the sampling control input 59 of sample and hold 58. During the presence of the gating signal, the sample and hold 58 is enabled to sample the voltage level of the difference signal then being generated by the phase detector 56. A voltage storage means, such as a capacitor, is included in the sample and hold 58 for storing a voltage representative of the sampled difference signal. At the end of the 32 usec. gating signal, the sample and hold 58 is disabled, thereby terminating the sampling of the difference signal and opening the phase lock loop. However, the sample and hold 58 stores the voltage representation of the sampled difference signal existing at the end of the 32 usec. sample period until the occurrence of the next 32 usec. gating signal generated during the succeeding television line. Since the phase shifter 60 receives this voltage representation until changed, it retains and continuously makes available the phase or intra line timing of the signal, i.e., color burst applied to analog burst hold 54 beyond the end of the television line in which the color burst occurred. Because the recyclable register of the burst store 40 provides a representation of the actual analog burst signal obtained from the beginning of the television line to be corrected, the phase shifted reference subcarrier provided by the phase shifter will contain the actual phase or intra line time base information from the beginning of the television line. As will be explained in detail below, this signal and another containing the actual phase or intra line time base information at the end of the television line being corrected are used together to correct the actual velocity errors that accumulate during that television line.

Velocity error measure 64 is also a phase lock loop comprised of phase detector 66, sample and hold 68 and phase shifter 70. As in analog burst hold 54, a representation of a color burst signal from zero error switch 52 is applied to one input of phase detector 66 of the velocity error measure 64. The other input of the phase detector 66 is coupled to receive the phase adjusted signal continuously provided by the phase shifter 70. For reasons that will become more apparent from the detailed description hereinbelow of the operation of phase shifter 70, the sample period here, however, occurs in each television line for 27 usec. during the occurrence of the signal color burst provided by the recyclable burst store 40 through switch 52 and prior to the 32 usec. sample period of the same line. The 27 usec. sample period is defined by a 27 usec. gating signal generated by the timing generator 41 in response to the signal H sync and issued at its output terminal 43b. The length of the sample period is chosen for convenience in operation of the circuit. Because the length of a television line of an NTSC signal is approximately 63.5 usec., the 27 usec. and 32 usec. sample periods do not overlap. Since the actual phase of a burst signal is held and continuously provided by analog burst hold 54 beyond the end of the television line in which the burst signal occurs, its phase information is available at the output of phase shifter 60 during the 27 usec. sample period of the succeeding line. It can be readily seen that the actual phase of the color burst of a first line is available in analog burst hold 54 to be compared with the actual phase of the color burst of a second succeeding line by velocity error measure 64.

The operations of the phase detector, sample and hold, and phase shifter elements of velocity error measure 64 are like those of the analog burst hold 54, except for timing and actual signals received and generated. The phase adjusted or shifted output signal provided by the phase shifter 60 of the analog burst hold 54 is used as the clock for phase shifter 70. Until the 27 usec. gating signal is received by sample and hold 68, the phase of the output signal from phase shifter 70, which is applied to phase detector 66, will coincide with the phase of the output of phase shifter 60. However, the phase detector 66 generates an error signal whenever a phase difference exists between its input signals. During the 27 usec. sample period the phase lock loop of velocity error measure 64 is closed by the 27 usec. gating signal provided by timing generator 41 to the sampling control input 69 of the sample and hold 68. Any error signal present at the output of the phase detector 66 is sampled and stored by the sample and hold 68. To sample and store the phase difference signal generated by the phase detector 66, sample and hold 68 is arranged to respond to its gating signal in the same manner as the sample and hold 58 of analog burst hold 54. The error signal provided by sample and hold 68 is provided as a dc voltage level representative of the difference in actual phase between the first and succeeding color bursts. This error signal causes the output phase of phase shifter 70 to shift to coincide with the phase of the color burst of the later or succeeding television line applied to phase detector 66. At the end of the 27 usec. sample period the loop opens at the sample and hold in the manner described with respect to sample and hold 58 and the error signal is held at the output of sample and hold 68 until the next 27 usec. sample period. The held error signal or dc voltage level represents the magnitude of the actual cummulative phase error for the horizontal line period associated with the color burst whose phase or intra line time base information is being held in analog burst hold 54. Because of the cooperation of the velocity error measure 64 and analog burst hold 54, the cummulative phase error information is continuously available for one line beyond that in which it occurred.

The output from sample and hold 68 is connected to the inputs of two error hold circuits 72, 74 connected in parallel to one another. The error signal generated by velocity error measure 64 is sampled by the error hold circuits 72, 74 for 20 usec. immediately after the velocity error measure 27 usec. sample period is terminated. The error holds 72, 74 are commanded to sample the error signal by a 20 usec. gating signal provided by the timing generator 41 at its output terminal 43c. This gating signal is coupled to the sampling control inputs 73 and 75 of the error holds 72 and 74 respectively. The 20 usec. gating signal causes one error hold to store a voltage representative of the voltage error signal then being provided by the sample and hold 68 of the velocity error measure 64.

The outputs of error hold circuits 72, 74 are connected respectively to two inputs of error switcher 76, schematically represented by two switches as shown, which alternately applies the error stored in either error hold 72, 74 to the input of a line by line error hold 78 one line at a time. Error switches 76 is controlled by timing generator 41 to change states every horizontal line so as to alternately connect error hold 72 and error hold 74 to line by line error hold 78, which is likewise controlled by the timing generator to sample and hold the error signal coupled thereto by error switcher 76. The error swtiches 76 is switched at, and the line by line error hold 78 is enabled for a period of 8 usec. following, the occurrence of reference H sync. Timing generator 41 generates an 8 usec. gating signal at terminal 43d to be applied to error switcher 76 at control terminal 77 and to error hold 78 at sampling control input 79 once each horizontal line. While the error stored in one error hold (e.g., error hold 72) is being applied to line by line error hold 78 by error switcher 76, the other error hold (e.g., 74) is ready (having applied the error stored therein during the previous line) to receive and store the error generated by velocity error measure 64 for another television line. An error hold is unable to receive and store an error signal present at its input until its contents have been transferred to the line by line error hold 76. Thus, error holds 72, 74 alternate in storing the error for every other television line and line by line error hold 78 alternately stores the error signal stored in error hold 72 and error hold 74. Both error holds 72 and 74 are required since the error signal for each television line must be determined as that line is reproduced by the recorder and may be available for storage before the error for the previous line has been sampled by line by line error hold 78.

For 8 usec. following the occurrence of the reference H sync at terminal 42a of timing generator 41, line by line error hold 78, which is a sample and hold circuit, is commanded by the 8 usec. gating signal to sample the velocity error applied to its input as explained. During the remaining period of the line, the velocity error is held by the line by line error hold for processing by ramp generator 80.

Ramp generator 80 produces a variable slope sawtooth waveform. It includes a controlled positive current source 82 and a controlled negative current source 84, both connected to charge a capacitor 86. The rate of current flow produced by the two current sources in conjunction is controlled by the voltage level of error signal stored by line by line error hold 78 and applied to ramp generator 80. The output of error hold 78 is coupled to the control input of positive current source 82. The current drawn by negative source 84 is normally constant and continuous. A ramp is generated for the length of at least the video information portion of one television line, having a slope determined by the current level generated by the sources and, hence, by the voltage level of the error signal and, therefore, proportional to the actual velocity error of one television line. At the end of each television line, which has a predetermined NTSC standard length of 63.5 usec., ramp reset 88 receives at its control input 89 the 8 usec. gating signal provided by timing generator 41. The ramp reset 88 operates in response to that gating signal to reset the ramp generator to nominal zero by discharging capacitor 86 to ground. Simultaneously, the error value for the next television line is sampled and held by line by line error hold 78 and then applied to positive source 82 of ramp generator 80 to generate a new ramp having the requisite slope. Ramp generator 80 operates to generate a new ramp for the length of the video information portion of a television line following each 8 usec. sample period of line by line error hold 78.

The variable sawtooth waveform thereby generated is applied to output phase shifter 90. This phase shifter is linear and similar to phase shifters 60 and 70 in structure and operation. A reference clock, which may be the same as provided by reference source 49, is applied to the input 99 of output phase shifter 90 to provide the basic signal frequency. The phase shifter is controlled, however, by the sawtooth waveform applied to the control input of the phase shifter to linearly shift the phase of or time displace the clock signal gradually across each television line.

The phase shifted signal is applied to an adjustable clock generator 50 to generate a clock signal whose time base can be varied by shifting it in phase by an amount dependent upon the actual phase shift represented by the signal provided thereto by phase shifter 90. The clock generator 50 includes a pulse shaper and frequency multiplier that cooperate to shape the signal applied to its input from the output of phase shifter 90 and multiply the frequency to produce a clock signal suitable for use by digital to analog converter 30.

Clock generator 50 is coupled to digital to analog converter 30 to control the timing rate of conversion of the television signal from digital to analog form in a known manner. For small progressively cumulative intra line time base errors converter 30 operates to store temporarily the signal in digital form. The temporary storage is achieved by converting the digitized signal to analog form at a timing rate controlled by the time base of clock 50. Since the rate of conversion of the television signal from digital to analog form by converter 30 is controlled by the time base adjusted clock signal, which is applied thereto in a known manner, the phase of the television signal will be linearly expanded or compressed monotonically across each television line in accordance with the determined actual velocity error of that line. Since, as previously explained, the velocity error is determined by the erroneous phase difference between representations of actual color bursts of two successive television lines, the shift in hue due to velocity error between the beginning and end of each line is known. The shift is presumed to be linear across each line.

If it is desirable to maintain a highly calibrated system, ramp generator 80 is arranged to determine and maintain a nominal zero reference. This is accomplished during each vertical blanking interval between television fields. During this period for a time of five lines, zero error switch is switched to replace at the input to the analog burst hold 54 the output from burst store 40 with the reference subcarrier signal provided by studio reference 49. This is controlled by a signal from timing generator 41 applied from terminal 43e to control terminal 53 of zero error switch 520. The same control signal is applied to terminal 93 to activate zero error sample and hold 92 for a purpose to be described. Under this condition reference subcarrier is applied to both phase detector 56 and phase shifter 60. There is no phase difference and the output from phase shifter 60 is the unshifted reference subcarrier signal. The reference subcarrier signal is also applied to phase detector 66. Velocity error measure 64, therefore, detects no phase difference and the error signal applied to ramp generator 80 represents zero velocity error. When activated, zero error sample and hold 92 samples this value and utilizes this zero value to calibrate the ramp generator negative current sources 84 which is a controlled current source. The input of zero error sample and hold is connected to capacitor 86 so that a voltage representation of the slope of the ramp generated in response to a zero phase shift is sampled and held. It is thereafter applied by the output of zero error sample and hold to the control terminal of negative current source 84 to set the current level to the proper rate to calibrate the ramp generator to nominal zero which, in this embodiment, constitutes a zero slope ramp.

The velocity error compensator of the present invention provides chroma phase correction with a full range of ± 180 degrees without the use of glass or vernier delay lines, thereby eliminating the consequent expense and limited range thereof. The true spirit and scope of the invention will become evident by reference to the following claims. What is claimed is:

1. A circuit for time displacing a color television signal which includes a color burst synchronizing component of known frequency in the synchronizing interval at the beginning of each of its lines, said color burst containing the intra line time base of the signal, said signal being passed through an analog to digital converter for converting each line to a digital form and thereafter through a digital to analog converter responsive to a clock signal for reconverting the digital form of the signal to an analog form, said time displacement circuit comprising means responsive to the color burst component of each television line passing through said analog to digital converter to provide a representation of said color burst component continuously during at least a portion of the succeeding line when the succeeding color burst occurs, means coupled to receive a representation of a color burst component of the next succeeding line and said continuously provided color burst representation and compare the contained intra line time bases, and means responsive to said comparing means for generating a clock signal with its time base adjusted in accordance with the differences in the compared time bases, said clock signal generating means coupled to said digital to analog converter for controlling the reconversion of the digitized line of television information occurring between said compared color burst representations to produce an analog form of said digitized signal having its time base in accordance with the clock signal time base.

2. The circuit of claim 1 wherein said clock signal generating means includes means for varying the clock signal time base progressively for a duration corresponding to the period of said television line, the clock signal time base at the end of the line corresponding to the intra line time base difference indicated by the comparing means.

3. The circuit of claim 2 wherein the television signal includes timing errors which are removed by time displacement, said comparing means providing an indication of the intra line time base difference which represents the timing error in the line of the television signal between compared color burst representations, and said clock signal time base varying means monotonically varies the clock signal time base in accordance with the indicated intra line time base difference.

4. The circuit of claim 3 wherein said means for varying the clock signal time base includes a variable slope ramp generator controlled in accordance with the time base difference.

5. The circuit of claim 1 further comprising a delay means in circuit between said analog to digital converter and said digital to analog converter to provide a time delay for the digitized signal issued by said analog to digital converter, said time delay selected to synchronize the coupling of the time adjusted clock signal to the digital to analog converter with the coupling of the television line including the time base difference according to which the coupled clock signal is adjusted.

6. The circuit of claim 5 wherein said clock signal generating means generates a clock signal whose time base varies progressively in accordance with said intra line time base difference for a duration corresponding to one television line.

7. The circuit of claim 6 wherein said delay means provides a time delay corresponding to the nominal time of two television lines.

8. The circuit of claim 1 wherein said means for continuously providing a representation of a color burst includes means for generating a fixed time base reference signal having a frequency corresponding to that of the color burst, means for comparing the phase of said color burst and that of said fixed time base reference signal, and means for adjusting the phase of the fixed time base reference signal to the phase of the compared color burst in response to the phase comparing means to form said continuously provided representation, said time base comparing means compares the phases of the representations received thereby to provide a phase difference signal representative of the timing error in the line of said television signal between the compared representations, and said clock signal generator means includes means responsive to said phase difference signal to monotonically vary the clock phase progressively in accordance with said phase difference for a duration corresponding to one television line.

9. The circuit of claim 1 further including means for generating a first gating signal at the beginning of each line and a second gating signal at the end of each line, and wherein said means for continuously providing a representation of a color burst component includes means responsive to the phase of each color burst component and the phase of a fixed time base reference signal to shift the phase of the fixed time base reference signal to that of the color burst component and thereby form said continuously provided representation, said phase shifting means enabled in response to the second gating signal to shift the phase of said fixed time base reference signal, said means for comparing representations includes means responsive to the phase of each phase shifted fixed time base reference signal and the phase of each color burst representation for generating a phase difference signal, said phase comparison means enabled in response to the first gating pulse to compare the phases, and said clock signal generating means is responsive to said phase difference signal to generate the clock signal.

10. The circuit of claim 9 wherein said means for continuously providing a representation of a color burst component includes means for continuously generating the color burst of each television line for the duration of the line, said continuously generated color bursts coupled to said phase shift means and to said phase difference signal generating means.

11. A signal time displacement adjuster for information signals which include a periodically occurring synchronizing component indicative of the signal time base comprising means coupled to periodically receive and continuously generate a representation of each synchronizing component until the period of a successive synchronizing component is received including means for comparing the time base indicated by the synchronizing component representation and that of a time base reference signal to adjust the time base of the reference signal to that indicated by the synchronizing component representation and form said continuously generated representation of the synchronizing component, means for comparing the time base indicated by the continuously generated representation of the synchronizing component representation next received to provide a signal representative of time base differences therebetween, and storage means coupled to receive said information signal responsive to said comparison to adjust the duration of storage of each period of said signal between successive synchronizing component representations in accordance with the time base difference signal provided by said comparing means.

12. The signal time displacement adjuster of claim 11 further comprising a delay means in circuit between a source of the information signals being adjusted and said storage means to provide a time delay for said information signals for synchronizing the adjustment of the duration of storage with the coupling to the storage means of the period of said information signal whose duration is to be adjusted.

13. The signal time displacement adjuster of claim 11 wherein said means for comparing the time bases indicated by the synchronizing component representation and that of said reference signal is adapted to receive a fixed time base reference signal.

14. The signal time displacement adjuster of claim 11 wherein said information signal includes a first periodic synchronizing component forming signal periods and a second periodic synchronizing component indicative of the intra period time base of each signal period, said continuous generation means receives said second periodic synchronizing component, and said comparing means is coupled to compare the time bases indicated by the second periodic synchronizing components.

15. The signal time displacement adjuster of claim 14 further comprising means reponsive to said comparing means for generating a clock signal with its time base adjusted in accordance with the time base difference indicated by said comparing means, and wherein said signals being adjusted are provided by an analog to digital converter, and storage means includes a digital to analog converter for reconverting the digitized signal to the analog form having its time base in accordance with time base of said clock signal, said clock signal coupled to a clock input of said digital to analog converter.

16. The signal time displacement adjuster of claim 15 further including means for providing an analog representation of the second periodic synchronizing component for each period of said signal, said analog representation coupled to said continuous generation means and said comparing means.

17. The signal time displcement adjuster of claim 15 further comprising a delay means in circuit between said analog to digital converter and said digital to analog converter to provide a time delay for the digitized signal for synchronizing the coupling of the time adjusted clock signal to the digital to analog converter with the coupling of the period of said signal including the time base difference according to which the coupled clock signal is adjusted.

18. The signal time displacement adjuster of Claim 11 wherein said continuous generation means includes a first time base adjustment means coupled to receive a reference signal of a fixed time base and adjust the time base thereof in accordance with a first difference signal, a first detector coupled to receive periodically a sample of the synchronizing component and the time base adjusted reference signal and produce said first difference signal representative of the time base difference between said received sample and said time base adjusted reference signal, and means for receiving and holding said first difference signal beyond the end of period whereby said first time base adjustment means continuously generates a time base adjusted reference signal representation of each sample of the synchronizing component; said comparing means includes a second time base adjustment means coupled to receive said time base adjusted reference signal and further adjust the time base thereof in accordance with a second difference signal, a second detector coupled to receive periodically a sample of the synchronizing component and the further time base adjusted reference signal and produce said second difference signal representative of the time base difference between said received sample and further time base adjusted reference signal, and means for holding said second difference signal until after said first difference signal holding means receives another first difference signal whereby the second time base difference signal is obtained for effecting the storage duration.

19. The signal time displacement adjuster of claim 18 further comprising means for generating a clock signal with its time base adjusted in accordance with said second time base difference signal, and wherein said storage means is responsive to said clock signal to adjust the storage duration.

20. The signal time displacement adjuster of claim 19 wherein said clock signal generating means includes means for varying the clock time base progressively for a duration corresponding to a duration between samples of the synchronizing component.

21. The signal time displacement adjuster of claim 18 further comprising means for generating a first gating signal at the beginning of each signal period defined by successive samples of said synchronizing component and a second gating signal at the end of each signal period, and wherein said first detector is responsive to each second gating signal to produce said first difference signal, and said second detector is responsive to each first gating signal to produce said second difference signal.

22. A video recorder for reproducing a television signal having a pilot tone synchronizing component and a video information component, said video recorder including a circuit to compensate for erroneous head to tape velocity comprising an analog to digital converter for converting a reproduced line of the video information to digital form, an adjustable clock generator for providing a clock signal, a digital to analog converter coupled to convert the digitized video information to analog form in response to said clock generator, means coupled to receive and continuously provide a first pilot tone synchronizing component representation beyond the end of a first line of said television signal in which it appears, means to compare the time base of said first pilot tone synchronizing component representation with the time base of a pilot tone synchronizing component representation of a succeeding line to produce a time base difference signal representative of the time base difference between said pilot tone synchronizing component representations, and means to adjust the time base of the clock provided by said clock generator to convert said first line to analog form in accordance with the time base difference signal.

23. The video recorder of claim 22 further including means to delay propagation of the digitized line of video information for a period to synchronize the coupling of the time base adjusted clock signal to the digital to analog converter with the coupling of the line of digitized video information between the compared pilot tone synchronizing component representations.

24. The recorder of claim 22 wherein said clock adjustment means includes a variable slope ramp generator controlled by said time base difference signal to provide a linear shift in the time base of said clock.

25. Apparatus for time displacing a signal while it is being converted from a digital form to an analog form comprising a digital to analog converter responsive to clock signals to receive and convert a series of digital signals to an analog representation, an adjustable time base clock signal generator for generating a clock signal having a time base dependent on the time base of a time base control signal, said clock signal coupled to said digital to analog converter to command it to convert said series of digital signals to an analog representation, and means for generating said time base control signal.

26. The apparatus of claim 25 wherein said digital signal contains unwanted time base error, said means for generating said time base control signal provides a signal representative of the unwanted time base error, and said clock signal generator provides a clock signal whose time base is compensatingly adjusted according to the represented time base error.

27. A velocity error compensator for adjusting the time base of an input color television signal having pilot tone synchronizing component indicative of the intra line time base of the television signal comprising means coupled to receive and continuously generate a representation of the pilot tone synchronizing component of a first line of said television signal for a duration extending beyond the end of the line in which the represented pilot tone synchronizing component appeared, means for comparing the phase of the continuously generated representation of the pilot tone synchronizing component with that of a pilot tone synchronizing component of a succeeding line of said television signal, and means responsive to the phase comparing means for progressively varying the time base of said first line of said television signal in accordance with the phase difference between the components compared by the phase comparing means.

28. The circuit of claim 27 wherein said means for continuously generating a representation of the pilot tone synchronizing component includes means for generating a fixed time base reference signal having a frequency corresponding to that of the pilot tone synchronizing component, means for comparing said phase of the pilot tone synchronizing component and that of said fixed time base reference signal, and means for adjusting the phase of the fixed time base reference signal to the phase of the compared pilot tone synchronizing component in response to the phase comparing means to form said continuously generated representation of said pilot tone synchronizing component.

29. The circuit of claim 28 wherein said means for comparing the phase of said pilot tone synchronizing component and of said fixed time base reference signal includes a first detector coupled to receive periodically a sample of the pilot tone synchronizing component and the phase adjusted fixed time base reference signal and produce a first difference signal representative of the time base difference between said received sample and said phase adjusted fixed time base reference signal, means for receiving and holding said first difference signal beyond the end of said first line, said holding means coupled to said means for adjusting the phase of the fixed time base reference signal to adjust the phase of the reference signal to that of the sample of the pilot tone synchronizing component, means coupled to receive said phase adjusted fixed time base reference signal and further adjust the phase thereof in accordance with a second difference signal, a second detector coupled to receive periodically a sample of the synchronizing component and the further phase adjusted fixed time base reference signal and produce said second difference signal representative of the phase difference between said received sample and further phase adjusted fixed time base reference signal, and means for holding said second difference signal until after said first difference signal holding means receives another first difference signal, said means for progressively varying the time base of said first line of said television signal responsive to said second difference signal.

30. The circuit of claim 29 further comprising means for generating a first gating signal at the beginning of each line of the television signal defined by said pilot tone synchronizing component sampled and a second gating signal at the end of each line, and wherein said first detector is responsive to each second gating signal to produce said first difference signal, and said second detector is responsive to each first gating signal to produce said second difference signal.

31. The circuit of claim 30 further comprising a delay means in circuit between the input of said color television signal and said means for progressively varying the time base of said television signal for providing a time delay for the color television signal to synchronize the progressive varying of the time base of said color television signal with the coupling of the line of the color television signal including the velocity error resulting in the produced second difference signal effecting said progressive variation of the time base.

* * * * *